No. 815,697. PATENTED MAR. 20, 1906.
W. J. HAGMAN.
MACHINE FOR DRILLING, BORING, MILLING, &c.
APPLICATION FILED AUG. 19, 1905.
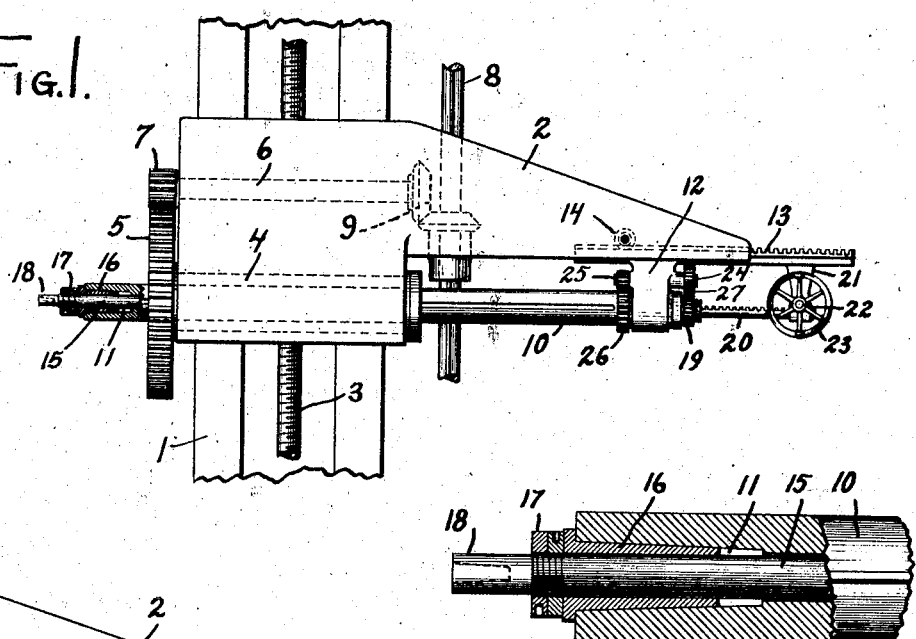
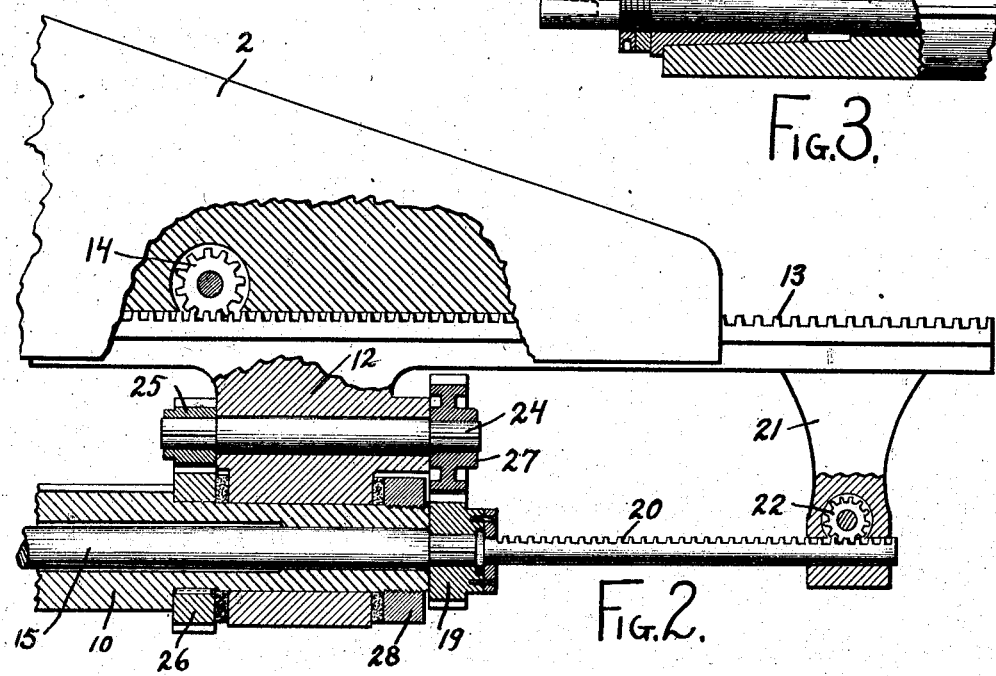
Witnesses:
Elmer R. Shipley.
M. S. Belden.
William J. Hagman
Inventor
by James W. See
Attorney

UNITED STATES PATENT OFFICE.

WILLIAM J. HAGMAN, OF PHILADELPHIA, PENNSYLVANIA, ASSIGNOR TO NILES-BEMENT-POND COMPANY, OF JERSEY CITY, NEW JERSEY.

MACHINE FOR DRILLING, BORING, MILLING, &c.

No. 815,697.     Specification of Letters Patent.     Patented March 20, 1906.

Application filed August 19, 1905. Serial No. 274,841.

*To all whom it may concern:*

Be it known that I, WILLIAM J. HAGMAN, a citizen of the United States, residing at Philadelphia, Philadelphia county, Pennsylvania, (post-office address, care Bement, Miles & Company, Philadelphia, Pennsylvania,) have invented certain new and useful Improvements in Machines for Drilling, Boring, Milling, &c., of which the following is a specification.

In certain classes of machines for drilling, boring, milling, &c., the tool-carrying spindle is of considerable size, appropriate to a machine designed for comparatively heavy work, and the speed of the spindle, while subject to selective changes, is comparatively low. It may be desirable to employ the same machines for working with small tools calling for higher speeds, and in such case, while the speed provision might be made ample, it would not be satisfactory to rotate the large and heavy spindle at the desired high speeds suited to the small tools.

My invention relates to improvements in this class of machines and provides a small secondary spindle driven at comparatively high speed through the intermediacy of the slower-moving heavy spindle.

The invention will be readily understood from the following description, taken in connection with the accompanying drawings, in which—

Figure 1 is a side elevation of a mechanism embodying an exemplification of my invention; Fig. 2, a side elevation of portions thereof on a larger scale, the spindles and their immediate accessories appearing in vertical longitudinal section; and Fig. 3, a vertical longitudinal section of the active end of the main spindle.

In the drawings, 1 indicates a portion of the vertical frame portion or column of the drilling, boring, or milling machine; 2, an armed saddle vertically adjustable thereon; 3, an elevating-screw for adjusting the saddle on the column; 4, a sleeve journaled in the saddle; 5, a gear fast on the sleeve; 6, a counter-shaft journaled in the saddle; 7, a pinion fast on the counter-shaft and having driving engagement with gear 5; 8, a splined driving-shaft; 9, gearing connecting the driving-shaft with the counter-shaft; 10, a main spindle splined in the sleeve; 11, a tool-holding socket in the front end of the main spindle; 12, a feeding-piece in the form of a bracket having sliding engagement with the arm of the saddle in a path parallel with the axis of the main spindle and having a bearing in which the rear end of the main spindle turns freely without the capacity for relative endwise motion; 13, a rack connected with the bracket 12, and 14 a pinion journaled in the arm of the saddle and engaging the rack and serving as means for feeding the spindle endwise.

The working of the parts thus far referred to is or may be precisely as in other machines employing an endwise-movable rotating spindle for the production of work by means of a tool carried at the forward end of the spindle, and a general arrangement of parts thus far referred to as being associated with the spindle may be considered as merely typical. Any proper tool secured upon or within the forward end of the spindle 10 is given its movement of rotation, the endwise adjustment of the spindle being effected by the turning of pinion 14. Attention will now be given to the secondary spindle and its attributes.

Continuing with the drawings, 15 indicates the secondary spindle disposed in an axial bore in the main spindle and capable of rotation and of endwise movement therein; 16, a bushing separately secured to the forward end of the main spindle 10, preferably by being secured in the socket 11 in the main spindle, this bushing forming a forward bearing for the secondary spindle where it engages the forward end of the main spindle; 17, a pair of lock-nuts screwed upon the secondary spindle near its forward end and abutting against the forward face of bushing 15; 18, the extreme forward or working end of the secondary spindle, the same projecting beyond the forward end of the main spindle and being arranged for having a tool secured to it—as, for instance, by being provided with a tool-receiving socket, as shown; 19, a pinion fast on the rear end of the secondary spindle and abutting against the rear end of the main spindle, this pinion 19 and the lock-nuts 17 forming thrust-surfaces carried by the secondary spindle; 20, a rack having its forward end swiveled to the end of the secondary spindle, so that the secondary spindle is free to turn while the rack 20 remains stationary; 21, a bracket projecting from feed-rack 13.

and furnishing a bearing in which the rack 20 may slide endwise; 22, a pinion journaled in bracket 21 and engaging rack 20; 23, a handle connected with the pinion 22, whereby the pinion may be turned and the rack 20 adjusted endwise; 24, a counter-shaft journaled in the feed-bracket 12; 25, a pinion fast on the forward end of this shaft; 26, a gear fast on the main spindle and having driving engagement with pinion 25; 27, a gear fast on the rear end of counter-shaft 24 and having driving engagement with pinion 19, and 28 a thrust-collar on the main spindle at the rear of the bearing of the main spindle in bracket 12.

Assume now that work with a small tool running at comparatively high speed is to be done. In such case the parts are employed in the condition illustrated in the drawings, and the tool is to be secured to the end 18 of the secondary spindle. As the main spindle turns at a given speed, it in an obvious manner transmits rotation at higher rate to the secondary spindle through the medium of gears 26, 25, 27, and 19. The secondary spindle is incapable of endwise movement relative to the main spindle by reason of the restraint effected by the locknuts 17 and the gear 19 acting as thrust members. It follows that as pinion 14 is operated to move bracket 13 there is produced an endwise movement of the main spindle, in which movement the secondary spindle is forced to accompany it. The feeding mechanism for the main spindle becomes therefore utilized as the feeding movement for the secondary spindle, and the main spindle while idle as a tool-carrying spindle serves as an agent in imparting rotary and rectilinear movement to the secondary spindle. When the two spindles thus move together endwise in unison, the tail-rack 20 partakes of the same endwise movement pinion 22 being merely an adjusting device having no office when the secondary spindle is in use or not in use. Assume, on the other hand, that the work is to be done by a comparatively slow-moving tool carried by the main spindle and that the secondary spindle is not needed. In such case a milling-tool or the like might be secured to the forward end of the main spindle and the machine employed precisely as though the secondary spindle were not present, except that the secondary spindle will be idly turned at its comparatively high speed. This idle turning of the secondary spindle and also the presence of its forward end at the forward end of the main spindle is undesirable, and provision is made for throwing the secondary spindle out of action and for retiring it. When the secondary spindle is to be retired, lock-nuts 17 are removed and by means of handle 23 tail-rack 20 is caused to pull the secondary spindle rearwardly until, say, its pinion 19 comes against bracket 21. This shifting of the secondary spindle has disconnected pinion 19 from gear 27 and has withdrawn the forward end 18 of the secondary spindle well back within the main spindle. The secondary spindle now remains non-rotary in retired position and bushing 16 may be removed from the forward end of the main spindle and the socket previously occupied by it be utilized in holding a tool. It is to be observed that when the secondary spindle is thrown out of action and retired in the manner explained it still partakes of the endwise movement of the main spindle, owing to the fact that brackets 12 and 21 move as one under the influence of the feed mechanism of the main spindle. The retiring movement for the secondary spindle as effected by the pinion 22 need therefore only be sufficient for the retiring purpose and may be independent of the length of the main spindle or of the extent of longitudinal motion imparted to it by its feed mechanism.

I have used the terms "forward," "rear," &c., in the merely relative sense.

The system is manifestly applicable to quite a variety of machines, whether the spindles be arranged horizontally or vertically. Indeed, with the drawing turned so that it may be viewed with the spindle vertical it may be taken as illustrating the adaptation of the system to a vertical-spindle machine.

I claim as my invention—

1. In a machine of the class described, the combination, substantially as set forth, of a main tool-carrying spindle, mechanism for rotating it, a secondary tool-carrying spindle disposed axially within the main spindle, gearing connecting the main spindle with the secondary spindle to cause the turning of the former to turn the latter at higher rate, and mechanism for disconnecting the gearing transmitting motion between the two spindles.

2. In a machine of the class described, the combination, substantially as set forth, of a main tool-carrying spindle, mechanism for rotating it and for adjusting it longitudinally, a secondary tool-carrying spindle disposed axially within the main spindle, gearing connecting the main spindle with the secondary spindle to cause the turning of the former to turn the latter at higher rate, and mechanism for disconnecting the gearing-transmitting motion between the two spindles.

3. In a machine of the class described, the combination, substantially as set forth, of a main spindle, mechanism for rotating it, a secondary spindle disposed axially within the main spindle, gearing connecting the main spindle with the secondary spindle to cause the turning of the former to turn the latter at higher rate, mechanism for disconnecting the gearing transmitting motion between the two spindles, and a feeding device connected with both the spindles for moving them longitudinally in unison.

4. In a machine of the class described, the combination, substantially as set forth, of a main spindle, mechanism for rotating it, a secondary spindle disposed axially within the main spindle, gearing connecting the main spindle with the secondary spindle to cause the turning of the former to turn the latter at higher rate, mechanism for disconnecting the gearing transmitting motion between the two spindles, and means for retiring the active end of the secondary spindle to within the main spindle.

5. In a machine of the class described, the combination, substantially as set forth, of a main spindle, mechanism for rotating it, a secondary spindle disposed axially within the main spindle, thrust members coacting with the two spindles to cause them to move together longitudinally, gearing connecting the main spindle with the secondary spindle to cause the turning of the former to turn the latter at higher rate, and a longitudinally-adjustable feeding-piece to shift the spindles endwise.

6. In a machine of the class described, the combination, substantially as set forth, of a main spindle, mechanism for rotating it, a secondary spindle disposed axially within the main spindle, thrust members coacting with the two spindles to cause them to move together longitudinally, gearing connecting the main spindle with the secondary spindle to cause the turning of the former to turn the latter at higher rate, a longitudinally-adjustable feeding-piece to shift the spindles endwise, and mechanism for disconnecting the gearing transmitting motion between the two spindles.

7. In a machine of the class described, the combination, substantially as set forth, of a main spindle, mechanism for rotating it, a secondary spindle disposed axially within the main spindle, thrust members coacting with the two spindles to cause them to move together longitudinally, gearing connecting the main spindle with the secondary spindle to cause the turning of the former to turn the latter at higher rate, a longitudinally-adjustable feeding-piece to shift the spindles endwise, and mechanism for disconnecting said gearing and for shifting the secondary spindle endwise relative to the main spindle.

8. In a machine of the class described, the combination, substantially as set forth, of a main spindle, mechanism for rotating it and for feeding it endwise, a secondary spindle disposed axially within the main spindle, a bushing separably secured to the forward end of the main spindle and forming a bearing for the secondary spindle, a thrust member carried by the secondary spindle and engaging the rear end of the main spindle, lock-nuts at the forward end of the secondary spindle to form thrust members at the forward end of the main spindle, a pinion upon the rear end of the secondary spindle, a gear near the rear end of the main spindle and having transmitting connection with said pinion, and mechanism for throwing said pinion out of operation.

9. In a machine of the class described, the combination, substantially as set forth, of a main spindle, mechanism for rotating it and for feeding it endwise, a secondary spindle disposed axially within the main spindle, a bushing separately secured to the forward end of the main spindle and forming a bearing for the secondary spindle, a thrust member carried by the secondary spindle and engaging the rear end of the main spindle, lock-nuts at the forward end of the secondary spindle to form thrust members at the forward end of the main spindle, a pinion upon the rear end of the secondary spindle, a gear near the rear end of the main spindle and having transmitting connection with said pinion, a rack disposed in line with the secondary spindle and swiveled to its rear end, and a pinion engaging said rack and serving to shift the secondary spindle rearward relative to the main spindle and throw its actuating-pinion out of action and retire the forward end of the secondary spindle to within the main spindle.

10. In a machine of the class described, the combination, substantially as set forth, of a main spindle, mechanism for rotating it and for feeding it endwise, a secondary spindle disposed axially within the main spindle, a bushing separably secured to the forward end of the main spindle and forming a bearing for the secondary spindle, a thrust member carried by the secondary spindle and engaging the rear end of the main spindle, lock-nuts at the forward end of the secondary spindle to form thrust members at the forward end of the main spindle, a pinion upon the rear end of the secondary spindle, a gear near the rear end of the main spindle and having transmitting connection with said pinion, a rack disposed in line with the secondary spindle and swiveled to its rear end, a rack in line with the spindle and swiveled to the rear end of the secondary spindle, a bracket engaged by said rack and moving longitudinally in unison with the main spindle, and a pinion mounted in said bracket and engaging said rack and serving to shift the secondary spindle endwise relative to the main spindle.

WILLIAM J. HAGMAN.

Witnesses:
W. T. SEARS,
W. B. PAGE.